Nov. 7, 1939.  F. LAWRENCE  2,178,725
AIRPLANE PROPULSION
Filed Oct. 3, 1938  2 Sheets-Sheet 2
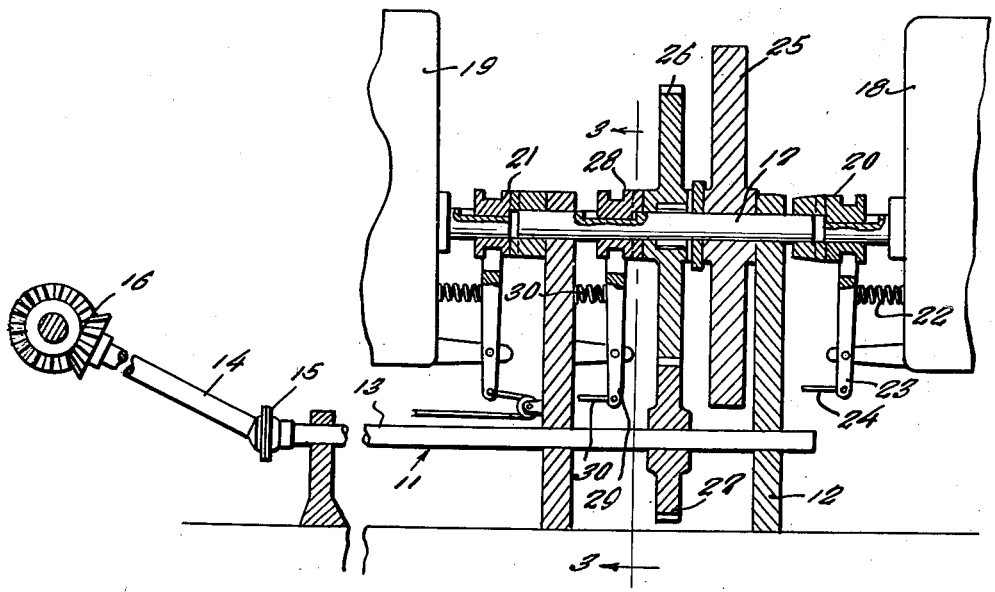
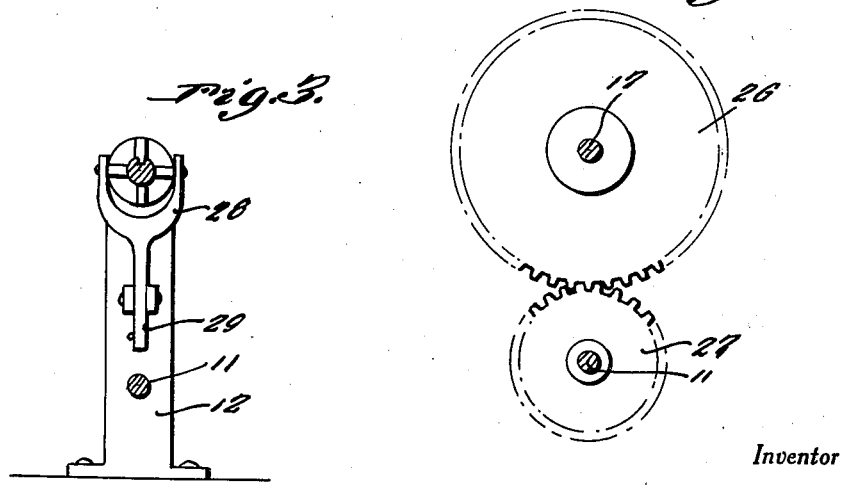
Inventor
Frank Lawrence
By Clarence A. O'Brien
and Hyman Berman
Attorneys Patented Nov. 7, 1939

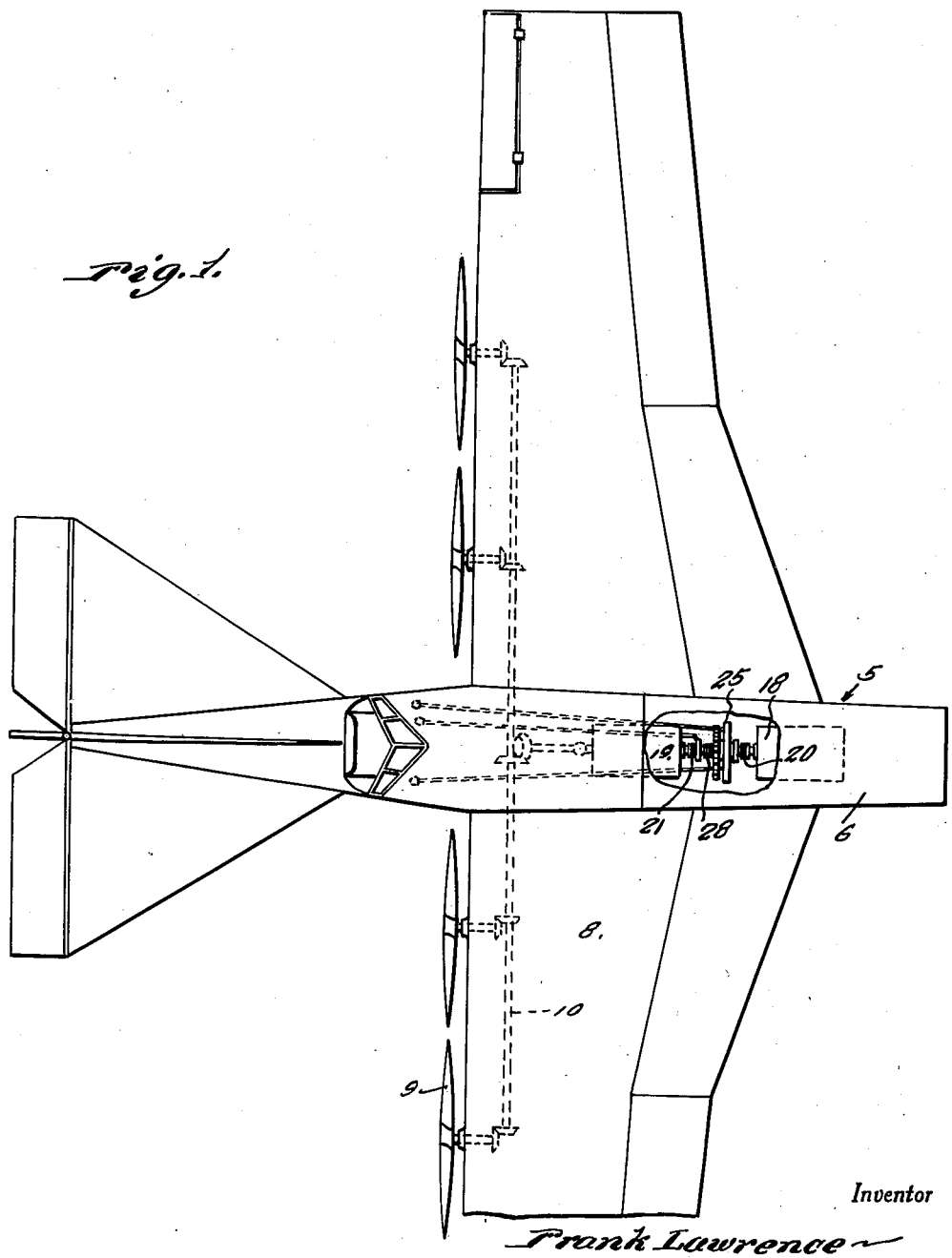

2,178,725

UNITED STATES PATENT OFFICE 2,178,725

AIRPLANE PROPULSION

Frank Lawrence, Masury, Ohio

Application October 3, 1938, Serial No. 233,084

1 Claim. (Cl. 74—389)

This invention relates to airplane propulsion and has for the primary object the provision of means whereby a series of propellers may be driven by several engines or may be driven by any one of the engines singly, providing a safety factor wherein either of the engines in case of improper functioning may be stopped to permit repairs to be made thereto while the airplane is sustained in flight by the other engine and also in case the engine cannot be repaired the airplane can be brought to a safe landing by the engine which is operating, and further the airplane being operable by a single engine will permit a saving to be had in fuel consumption, should it be necessary to conserve fuel in order to reach a selected destination.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary top plan view illustrating an airplane equipped with a propulsion means constructed in accordance with my invention.

Figure 2 is a fragmentary vertical sectional view illustrating the power transmission employed between the propellers and the engines.

Figure 3 is a transverse sectional view taken on the line 3—3 of Figure 2.

Figure 4 is a diagrammatical view showing the drive gears between the engine shaft and a drive shaft of the propellers.

Referring in detail to the drawings, the numeral 5 indicates an airplane consisting of the usual fuselage 6, tail construction 7 and wings 8. A series of propellers 9 are journaled on the wings 8 at the rear edges thereof and the shafts of said propellers are geared to a driven shaft 10 extending into the fuselage 6. The driven shaft 10 is geared to a drive shaft 11 arranged in the fuselage and rotatably supported in suitable hangers 12 and includes sections 13 and 14 connected by a universal joint 15 permitting the section 14 to be arranged angularly to the section 13. The section 14 is geared to the driven shaft 10, as shown at 16.

An engine shaft 17 is also rotatably supported by the hangers 12 and is arranged in a plane above and parallel with the drive shaft 11. Opposing the ends of the engine shaft 17 are engines 18 and 19. Clutches 20 and 21 are provided for connecting the engines 18 and 19 to the engine shaft 17. The clutches are equipped with springs 22 acting to normally engage the clutches. The clutches 20 and 21 includes pivotally mounted operating levers 23 to which control means 24 are connected. The control means 24 extend to the cockpit of the fuselage whereby the pilot of the airplane may engage or disengage the clutches 20 and 21, consequently permitting either of the engines to drive the shaft 17 singly or simultaneously.

The shaft 17 is equipped with a fly wheel 25 to provide for smooth operation and to aid in maintaining the engines running.

A drive gear 26 is journaled on the engine shaft 17 and is in continuous mesh with the gear 27 secured on the drive shaft 11. A clutch 28 is employed for connecting and disconnecting the drive gear 26 with the engine shaft and includes an operating lever 29 provided with a suitable control means 30 extending to the cockpit of the airplane, whereby the drive between the engine shaft 17 and the drive shaft 11 may be interrupted at any time desired. The clutch 28 is equipped with a spring 30' acting to normally engage said clutch.

In operation, when it is desired to warm up the engines 18 and 19 prior to the airplane taking off, the clutch 28 is operated to disengage the drive gear 26 from the engine shaft 17. With the clutch 28 disengaged, the engines 18 and 19 may be run without influencing the propellers of the airplane. When it is desired to take-off through the use of both engines, all clutches are engaged so that the power of the engines will be delivered through the shaft 17, gears 26 and 27 to the drive shaft 11, thence to the driven shaft and the propellers.

Should either of the engines become defective and need repair while the airplane is in flight, that engine may be readily disconnected from the engine shaft so that necessary repairs may be made thereto. If it is found that the engine cannot be repaired, the other engine is sufficient to bring the airplane to a safe landing and further if at any time it is found that the fuel supply is running low, one of the engines may be stopped and disconnected from the engine shaft 17 so that the airplane may proceed to the destination by the single engine, consequently using less fuel and allowing the destination to be reached which in all probability could not have been reached through the use of both engines.

It is believed that the foregoing description, when taken in connection with the accompanying drawings, will fully set forth the construction and advantages of this invention to those skilled in the art to which such invention relates so that further detailed description will not be required.

What I claim is:

In a device of the character described, spaced vertically arranged hangers positioned between opposed engines, a driven shaft rotatably supported on said hangers, a drive shaft journaled on said hangers, clutches for connecting and disconnecting the drive shaft to said engines, a gear secured on the driven shaft, a second gear meshing with the first gear and journaled on the drive shaft, and a clutch for connecting and disconnecting the second gear with the drive shaft.

FRANK LAWRENCE.